United States Patent
Ehrhardt et al.

[11] Patent Number: 6,086,130
[45] Date of Patent: Jul. 11, 2000

[54] METHOD OF INSTALLING A CARPET MEMBER WITHIN A MOTOR VEHICLE

[75] Inventors: Stuart A. Ehrhardt, Davisburg; Paul J. Sauve, Warren, both of Mich.

[73] Assignee: Chrysler Corporation, Auburn Hills, Mich.

[21] Appl. No.: 09/045,252

[22] Filed: Mar. 20, 1998

[51] Int. Cl.[7] .................................................. B60R 13/00
[52] U.S. Cl. ........................... 296/39.1; 296/97.23; 16/4
[58] Field of Search .............................. 296/39.1, 97.23, 296/1.1, 208; 16/4; 174/72 A; 307/10.1; 361/826

[56] References Cited

U.S. PATENT DOCUMENTS

| | | |
|---|---|---|
| 495,844 | 4/1893 | Solt . |
| 1,782,695 | 11/1930 | Prez . |
| 2,051,191 | 8/1936 | Watson . |
| 2,498,991 | 2/1950 | Gibson . |
| 2,514,335 | 7/1950 | Owens . |
| 2,587,836 | 3/1952 | Goodemoot . |
| 2,611,918 | 9/1952 | Jaasund . |
| 3,630,564 | 12/1971 | Ferrara ..................................... 296/1.1 |
| 4,187,656 | 2/1980 | Lutz . |
| 4,751,764 | 6/1988 | Reuben . |
| 4,829,627 | 5/1989 | Altus et al. . |
| 5,192,599 | 3/1993 | Sakamoto . |
| 5,439,725 | 8/1995 | Roberts ........................... 296/97.23 X |
| 5,573,294 | 11/1996 | Mack ................... 296/97.23 |
| 5,876,090 | 3/1999 | Kawaguti ............... 296/208 |
| 5,921,605 | 7/1999 | Musukula et al. ........................ 296/63 |

FOREIGN PATENT DOCUMENTS

| | | | |
|---|---|---|---|
| 3337596 | 4/1988 | Germany ............... 296/1.1 |
| 57-194166 | 11/1982 | Japan ..................... 296/1.1 |
| 6-156322 | 6/1994 | Japan ..................... 296/208 |
| 2203598 | 10/1988 | United Kingdom . |

*Primary Examiner*—D. Glenn Dayoan
*Assistant Examiner*—Jason Morrow
*Attorney, Agent, or Firm*—James R. Yee

[57] ABSTRACT

A method of installing a carpet member in a motor vehicle includes the general step of orienting the carpet member so that an underside faces upward. The method additionally includes the step of engaging an edge of the carpet member with a plurality of studs upwardly extending from the vehicle. The method of the present invention further includes the step of rotating the carpet member about the plurality of studs to conceal the plurality of studs.

10 Claims, 4 Drawing Sheets

METHOD OF INSTALLING A CARPET MEMBER WITHIN A MOTOR VEHICLE

BACKGROUND AND SUMMARY OF THE INVENTION

The present invention generally relates to motor vehicles. More particularly, the present invention relates to a method for installing a carpet member within a motor vehicle.

Various carpet members are installed within conventional motor vehicles for improving appearance and for occupant comfort. A number of techniques are known for securely installing such carpet members within a motor vehicle. For example, it is known to employ adhesive, loose fasteners, or other means for securing a carpet member to the vehicle body.

While known techniques for securing a carpet member in a motor vehicle have proven to be acceptable for various applications, limitations in the pertinent art exist. In this regard, known techniques incorporating loose fasteners require additional final vehicle assembly steps. Other known techniques are cost prohibitive.

One known technique for securely mounting a carpet member within a motor vehicle utilizes existing studs which upwardly extend from the body. For example, such studs are often used for attaching a wire harness or other structure to the motor vehicle. By using existing studs, associated cost and labor can be reduced.

A limitation to this specific known technique has been identified when used to secure a carpet member to a cargo/trunk of a convertible motor vehicle. Heretofore, in such applications, a cut and sewn carpet assembly has been secured to the body of the vehicle at the leading edge by means of a wire harness, which is seated down onto metal studs that project upwardly from the body. When the convertible top is stowed within the cargo/trunk area of the vehicle, the exposed wire harness attachments present potential wear issues for the convertible top. Molding of the cargo/trunk carpet over the wire harness has been considered but determined to be prohibitive from both investment as well as timing standpoints.

Thus, it is desirable to provide an improved method of installing a carpet member within a motor vehicle which overcomes the disadvantages associated with the prior art, including but not limited to those specifically discussed above.

The general objects of the present invention include providing a method for installing a carpet member within a motor vehicle which improves the appearance of a cargo/trunk area and protects a stowed convertible top from damage, while also minimizing associated cost and labor. In one form, the present invention is directed to a method of attaching a carpet member to a surface of a motor vehicle including a wire harness. The carpet member includes a top side, a bottom side and first and second opposing edges. The method comprises the general steps of providing a line of studs along the surface; engaging the carpet member with the studs while the top side of the carpet member faces downward; securing the carpet member to the studs with the wire harness; and rotating the carpet member over the studs such that the top side faces upward and the carpet member covers the studs and the wire harness.

In a more preferred form, the present invention is directed to a method of installing a carpet member within a cargo/trunk area of a motor vehicle. The motor vehicle includes a convertible top selectively movable to a stored position within the cargo/trunk area and a wire harness attached to the motor vehicle through a plurality of upwardly extending studs. The carpet member has a top side, a bottom side and front and rear edges. The method begins with the general step of orienting the carpet member so that the top side faces upward. The next general step involves engaging the forward edge of the carpet member with the plurality of studs. The method of the present invention further includes the general step of rotating the carpet member so that the top side surface faces upward. The carpet member conceals the wire harness and the plurality of studs and thereby protects the convertible top from excessive wear.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
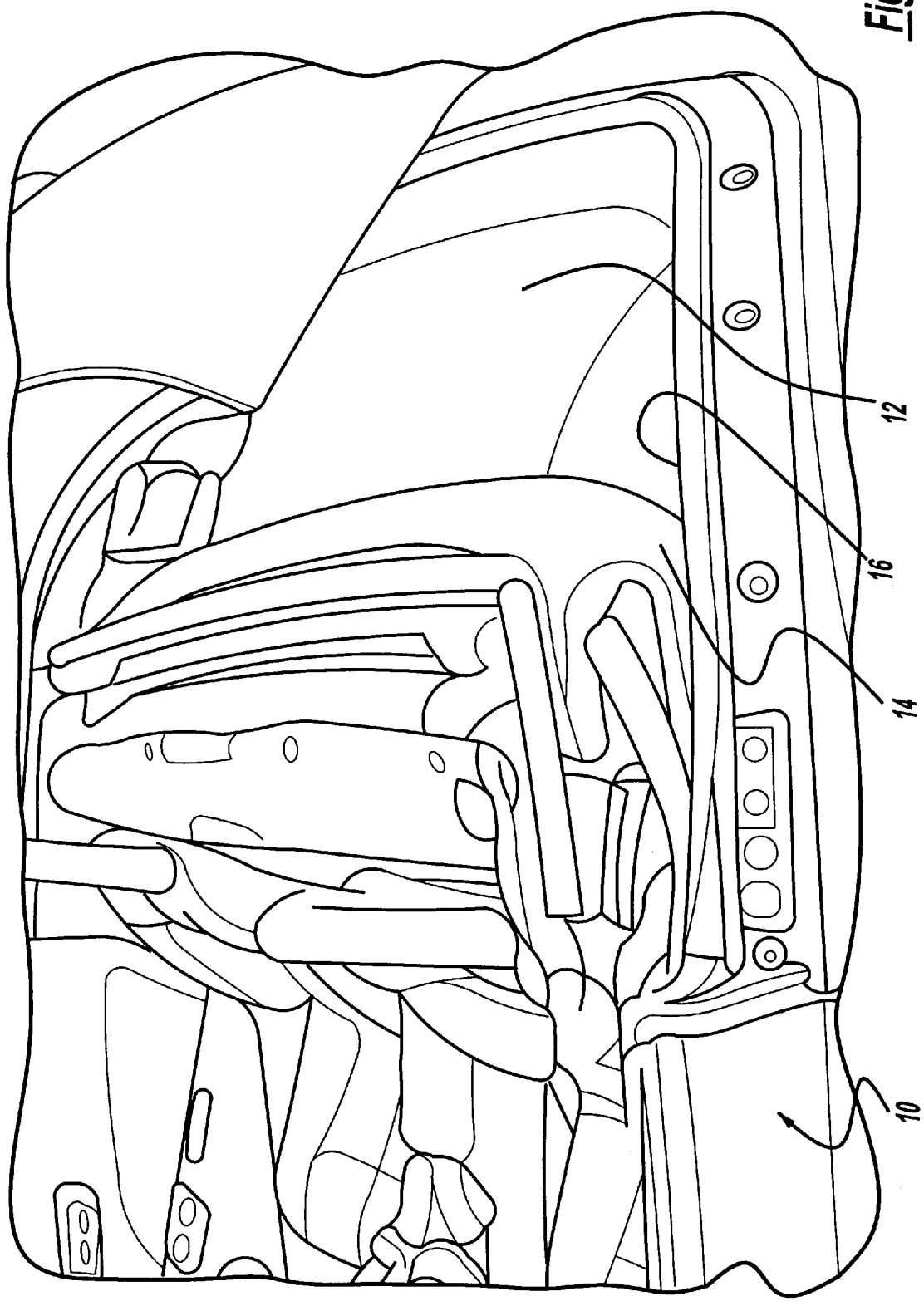
FIG. 1 is a perspective view of a portion of an exemplary motor vehicle incorporating a carpet member installed with a method according to the teachings of a preferred embodiment of the present invention.

With initial reference to FIG. 1, a portion of a motor vehicle 10 is illustrated to include a carpet member 12 installed within the vehicle 10 with a method according to the teachings of a preferred embodiment of the present invention. The exemplary vehicle 10 shown in FIG. 1 is a convertible having a convertible top 14 selectively retractable to a stowed position within a cargo/trunk area 16 of the motor vehicle 10. The carpet member 12 is preferably installed within the cargo/trunk area 16. However, it will become apparent to those skilled in the art, that the teachings of the present invention have applicability beyond the exemplary views shown throughout the drawings.

Figure 2:
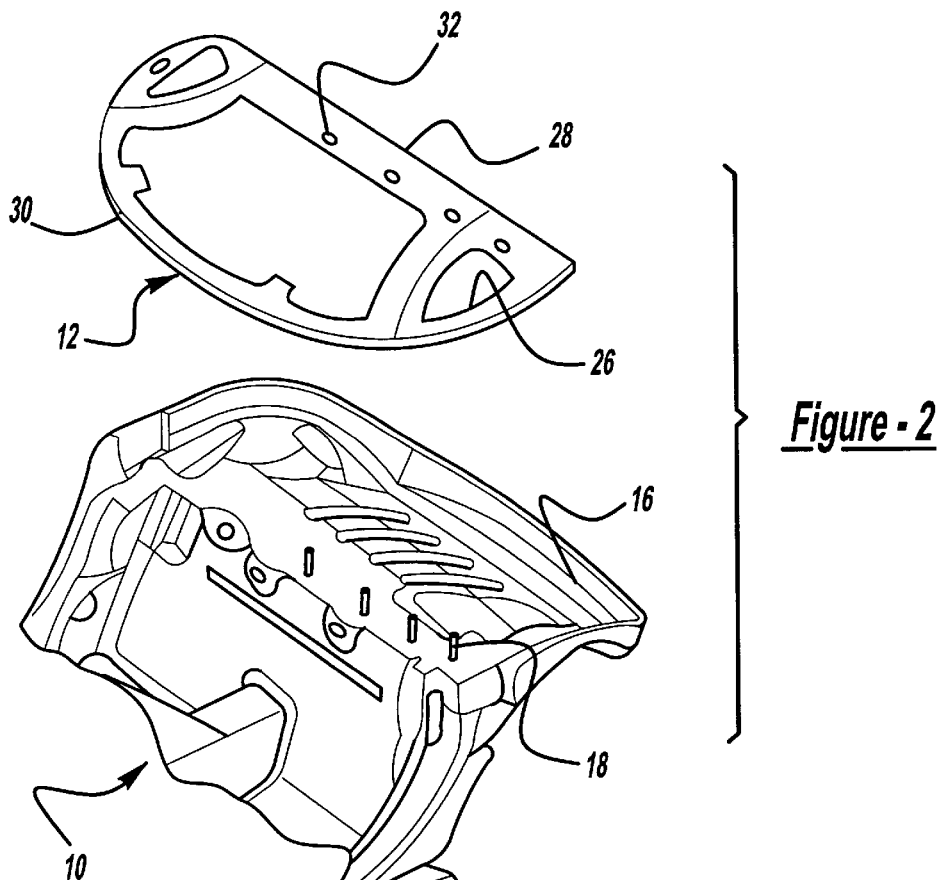
FIGS. 2–6 illustrate the general step of the preferred method of the present invention.
Figure 3:
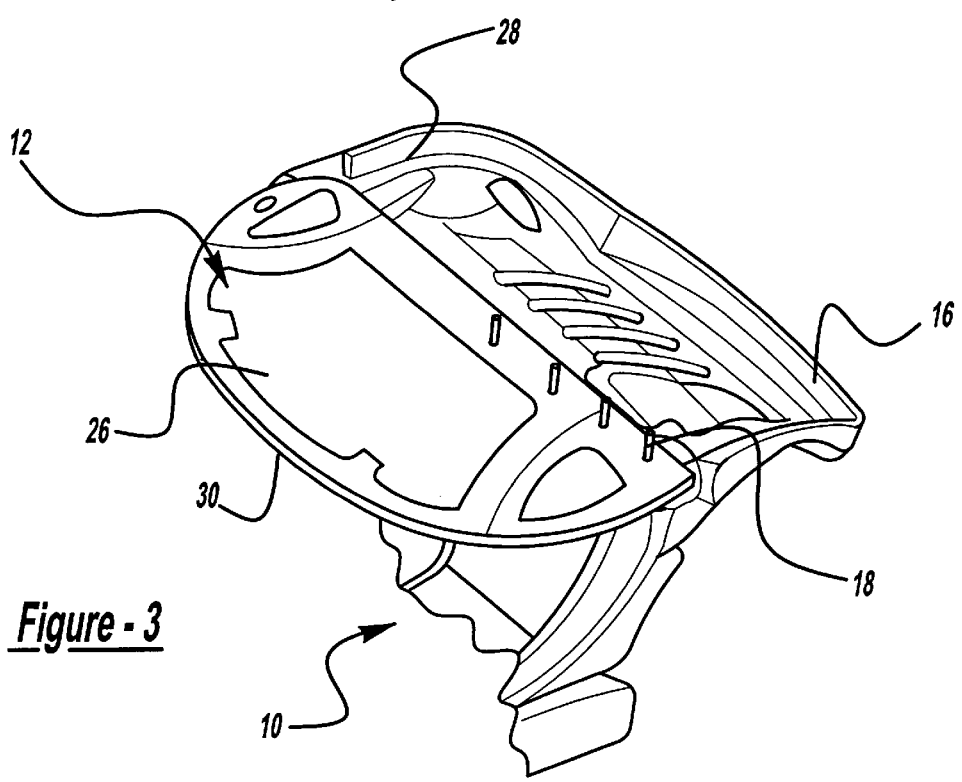
Figure 4:
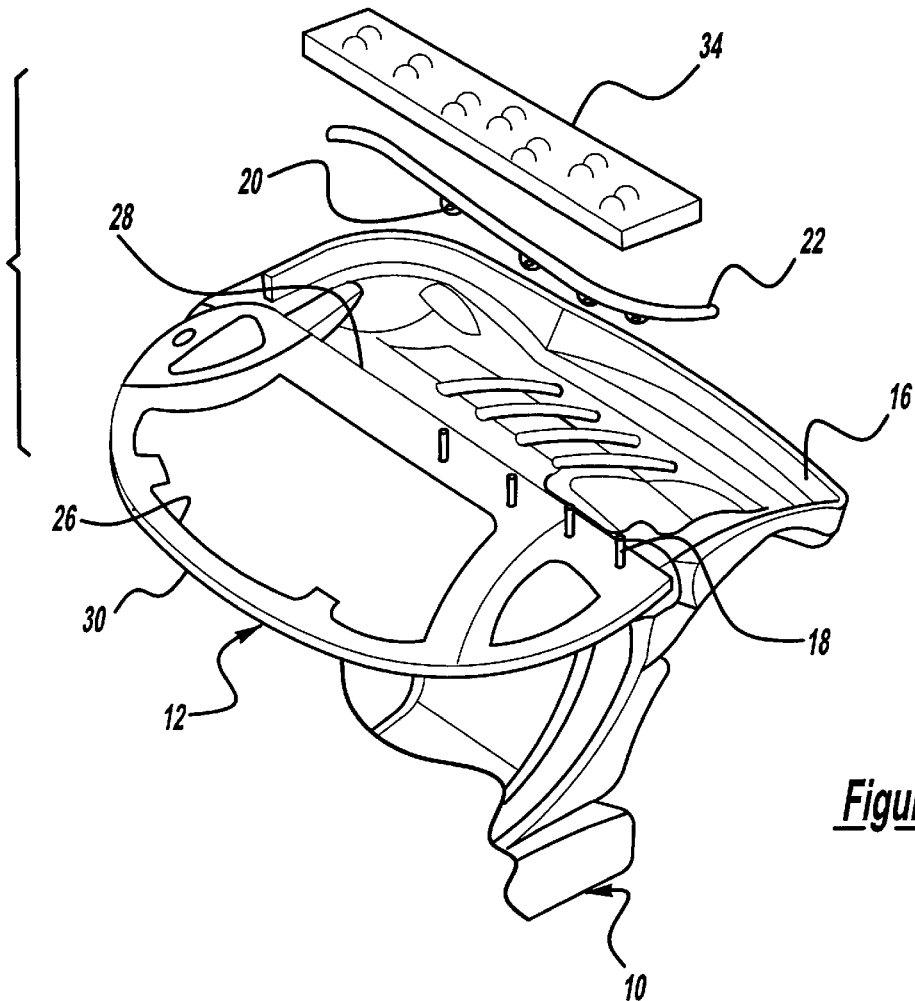

As shown most clearly in FIGS. 2–4, the motor vehicle 10 includes a plurality of mounting studs 18 which upwardly extend from the cargo/trunk area 16 adjacent a front edge thereof. The plurality of studs 18 are adapted to engage a corresponding plurality of mounting portions 20 carried by a conventional wire harness 22 (shown in FIG. 4). While not illustrated in detail, it will be understood that the mounting portions 20 are conventional in construction and are formed to include an aperture received by one of the mounting studs 10.

The carpet member 12 is preferably a cut and sewn assembly having a shape generally corresponding with the cargo/trunk area 16 of the vehicle 10. The carpet member 12 includes an upper side or appearance side 24 adapted to upwardly face when the carpet member 12 is fully installed. Opposite therefrom, the carpet member 12 includes a lower side or bottom side 26. The carpet member 12 is further shown to include a forward edge 28 and a rear edge 30. In the preferred embodiment, a plurality of apertures 32 are positioned adjacent the forward edge 28.

With continued reference to FIG. 1 and additional reference to FIGS. 2–6, the preferred method of the present invention will now be described. As specifically shown in FIG. 2, the carpet member 12 is oriented such that the apertures 32 adjacent the forward edge 28 thereof align with the studs 18 and the bottom side 26 of the carpet member 12 faces upward. As shown in FIG. 3, the studs 18 are engaged with the carpet member 12 by passing the studs 18 through the apertures 32.

With reference to FIG. 4, the carpet member 12 is next secured to the studs 18 through attachment of the wire harness 22. In this regard, the studs 18 engage the mounting members 20 carried by the wire harness 22. The conventional mounting members 20 resist inadvertent removal of the wire harness 22 from the studs 18. Next, a foam cushion 34 is placed over the studs 18 to conceal their upwardly extending ends.

Figure 5:
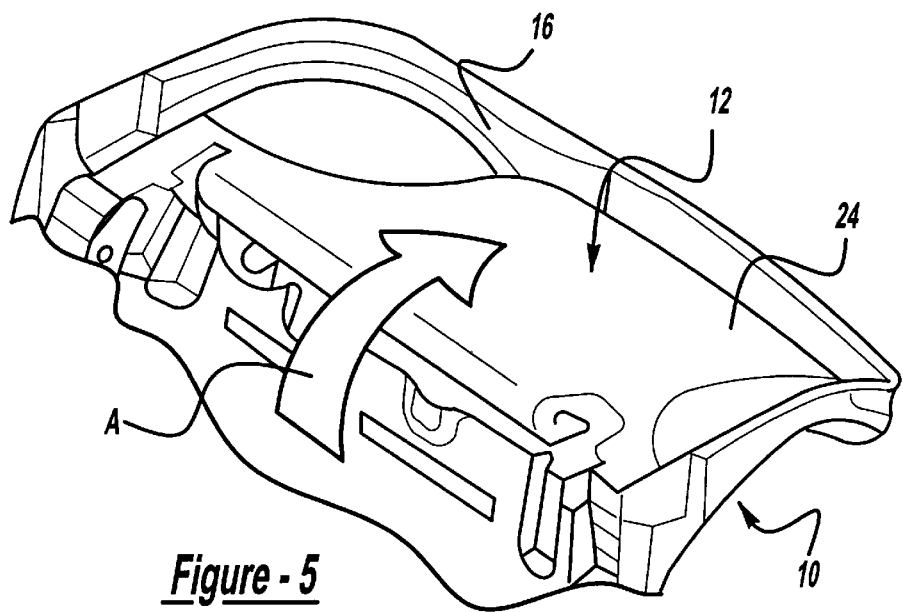
Figure 6:
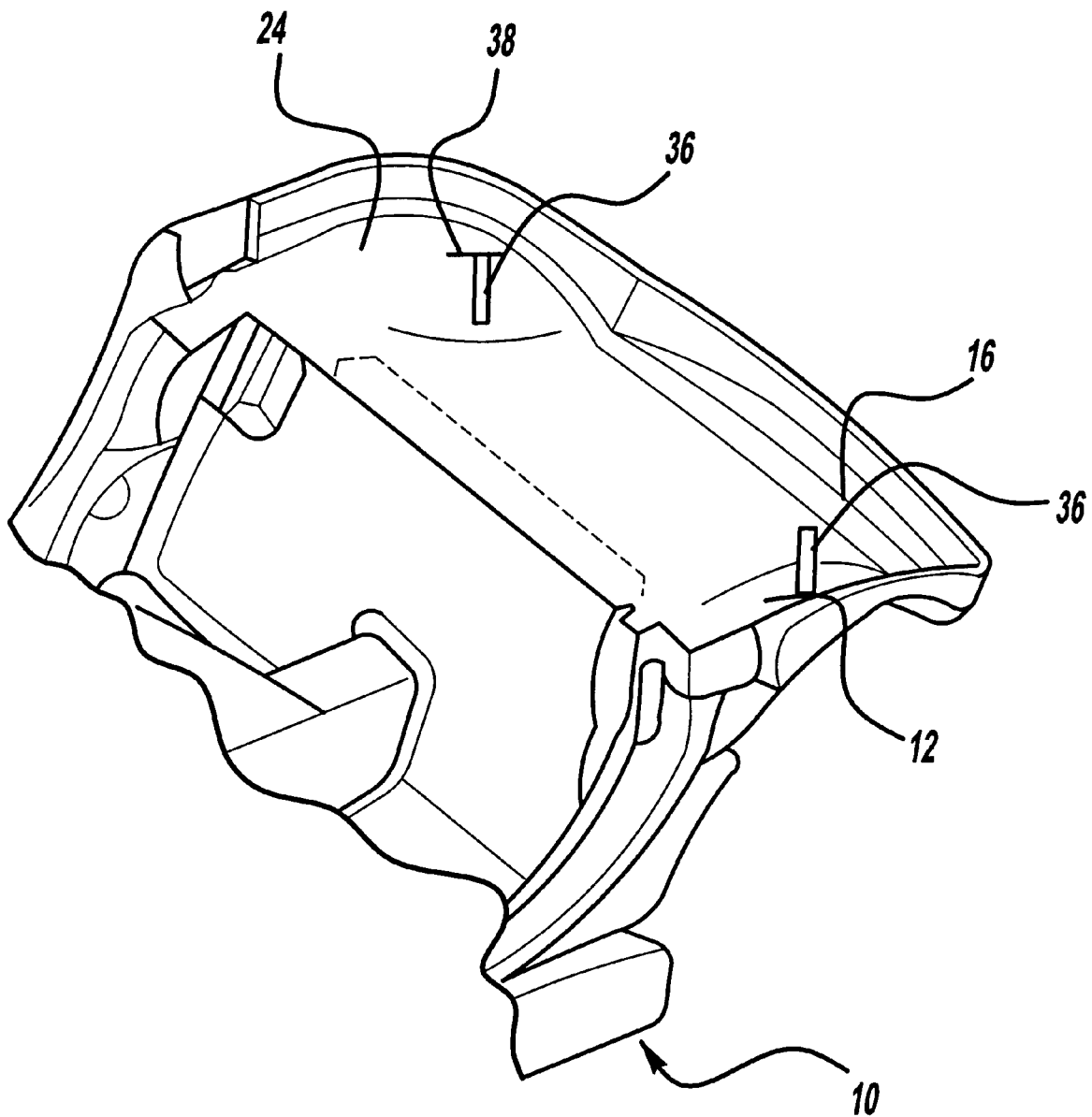

As shown in FIGS. 5 and 6, the carpet member 12 is next rotated over the studs 18. The direction of rotation is identified with arrow A. Such rotation of the carpet member 12 serves to orient the appearance side 24 to face upward and cover the studs 18 and the wire harness 22 with the carpet member 12. As shown in FIG. 6, a pair of tie-down straps 36 extend through apertures in the carpet member 12 which may be used to secure the convertible top 14 when it is in its stored position.

While the above description constitutes the preferred embodiment of the invention, it will be appreciated that the invention is susceptible to modification, variation, and change without departing from the proper scope or fair meaning of the accompanying claims.

We claim:

1. A method of attaching a carpet member to a surface of a motor vehicle, the motor vehicle including a wire harness, the carpet member having a top side, a bottom side and first and second opposing edges, the method comprising the steps of:

providing a line of studs upwardly extending from the surface;

engaging the carpet member with said studs;

securing the carpet member to said studs with the wire harness; and rotating the carpet member over said studs so that the top side faces upward and the carpet member covers said studs and the wire harness.

2. The method of attaching a carpet member to a surface of a vehicle of claim 1, wherein the step of engaging the carpet member with said studs comprises the step of providing a plurality of openings in the carpet member proximate the first edge for receiving said studs.

3. The method of attaching a carpet member to a surface of a vehicle of claim 1 wherein the step of engaging the carpet member with said studs includes the step of orienting the carpet member so that the top side faces downward.

4. The method of attaching a carpet member to a surface of a vehicle of claim 1, further comprising the steps of:

providing a cushioned member and;

placing the cushioned member over said studs before the step of rotating the carpet member so that the top side faces upward.

5. A method of attaching a carpet member to a surface of a motor vehicle, the carpet member having a top side, a bottom side and first and second edges, the method comprising the steps of:

orienting the carpet member so that the top side faces downward;

securing the first edge of the carpet member to the surface of the motor vehicle; and rotating the carpet member so that the top side faces upward;

wherein the step of securing the first edge of the carpet member to the surface of the motor vehicle comprises the steps of:

providing a line of studs along the surface; and providing a wire harness; and securing the carpet member to the studs with the wire harness.

6. The method of attaching a carpet member to a surface of a vehicle of claim 5, wherein the step of securing the first edge of the carpet member to the surface of the motor vehicle further comprises the step of providing a plurality of openings in the carpet member proximate the first edge for receiving said studs.

7. The method of attaching a carpet member to a surface of a vehicle of claim 5, further comprising the steps of:

providing a cushioned member and;

placing the cushioned member over said studs before the step of rotating the carpet member so that the top side faces upward.

8. A method of installing a carpet member within a cargo/trunk area of a motor vehicle, the motor vehicle including a convertible top selectively moveable to a stored position within the cargo/trunk area and a wire harness attached to the motor vehicle through a plurality of studs upwardly extending from the trunk/cargo area, the carpet member having a top side, a bottom side and front and rear edges, the method comprising the steps of:

orienting the carpet member so that the top side faces downward;

engaging the forward edge of the carpet member with the plurality of studs;

rotating the carpet member so that the top side faces upward; and engaging the wire harness with the plurality of studs.

9. The method of attaching a carpet member to a surface of a vehicle of claim 8, further comprising the step of providing a plurality of openings in the carpet member proximate the first edge for receiving said studs.

10. The method of attaching a carpet member to a surface of a vehicle of claim 8, further comprising the steps of:

providing a cushioned member; and placing the cushioned member over said studs before the step of rotating the carpet member so that the top side faces upward.

* * * * *